US012637531B2

(12) United States Patent
Shimanaka et al.

(10) Patent No.: US 12,637,531 B2
(45) Date of Patent: May 26, 2026

(54) PIGMENT DISPERSANT COMPOSITION, PRODUCTION METHOD THEREFOR, PIGMENT DISPERSION, AND ACTINIC-RAY-CURABLE INK-JET INK

(71) Applicant: DAINICHISEIKA COLOR & CHEMICALS MFG. CO., LTD., Tokyo (JP)

(72) Inventors: Hiroyuki Shimanaka, Tokyo (JP); Yoshikazu Murakami, Tokyo (JP); Jun Kamabayashi, Tokyo (JP); Toshiyasu Fujita, Tokyo (JP); Kazutaka Arai, Tokyo (JP); Sachio Yoshikawa, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 631 days.

(21) Appl. No.: 18/042,735

(22) PCT Filed: Aug. 12, 2021

(86) PCT No.: PCT/JP2021/029732
§ 371 (c)(1),
(2) Date: Feb. 23, 2023

(87) PCT Pub. No.: WO2022/050017
PCT Pub. Date: Mar. 10, 2022

(65) Prior Publication Data

US 2023/0357479 A1 Nov. 9, 2023

(30) Foreign Application Priority Data

Sep. 3, 2020 (JP) ................................ 2020-148425

(51) Int. Cl.

| | |
|---|---|
| ***C08F 2/46*** | (2006.01) |
| ***C08F 2/50*** | (2006.01) |
| ***C08F 285/00*** | (2006.01) |
| ***C08G 61/04*** | (2006.01) |
| ***C08K 3/04*** | (2006.01) |
| ***C08K 3/22*** | (2006.01) |
| ***C08K 5/23*** | (2006.01) |
| ***C08K 5/3437*** | (2006.01) |
| ***C08K 5/56*** | (2006.01) |
| ***C09D 11/106*** | (2014.01) |
| ***C09D 11/322*** | (2014.01) |
| ***C09D 11/326*** | (2014.01) |

(52) U.S. Cl.
CPC .............. *C08F 285/00* (2013.01); *C08K 3/04* (2013.01); *C08K 3/22* (2013.01); *C08K 5/23* (2013.01); *C08K 5/3437* (2013.01); *C08K 5/56* (2013.01); *C09D 11/106* (2013.01); *C09D 11/322* (2013.01); *C09D 11/326* (2013.01); *C08K 2003/2237* (2013.01)

(58) Field of Classification Search
CPC ... C08K 3/04; C08K 3/22; C08K 5/23; C08K 5/56; C08K 5/3437; C08K 2003/2237; C09D 11/322; C09D 11/326; C09D 11/16; C09D 11/101; C09D 17/00; C08F 285/00
USPC ........... 522/78, 74, 71, 1, 6, 189, 184; 520/1
See application file for complete search history.

(56) References Cited

U.S. PATENT DOCUMENTS

2008/0314292 A1 12/2008 Shimanaka et al.
2015/0291718 A1 10/2015 Shimanaka et al.

FOREIGN PATENT DOCUMENTS

JP 2003238836 A * 8/2003
JP 2006-273974 10/2006
JP 2009-024165 2/2009
JP 2010-084037 4/2010
JP 2013-177580 9/2013

(Continued)

OTHER PUBLICATIONS

Ikeda et al, JP 2003238836 Machine Translation, Aug. 27, 2003 (Year: 2003).*

(Continued)

*Primary Examiner* — Jessica Whiteley
(74) *Attorney, Agent, or Firm* — HSML P.C.

(57) ABSTRACT

An environmentally friendly pigment dispersant composition having a significantly reduced content of a volatile component despite of including a pigment dispersant that contains a constituent unit derived from a vinyl-based monomer, is provided. The composition can provide a pigment dispersion and an ink having excellent pigment dispersability. This pigment dispersant composition contains a polyglycol component and a polymer component having a constituent unit (1) derived from a macromonomer represented by formula (1), and a constituent unit (2) derived from a functional group-containing vinyl-based monomer, where the polyglycol component is a polyalkylene glycol or the like and has a content of an organic compound having a boiling point of 250° C. or lower of 1% by mass or less:

(1)

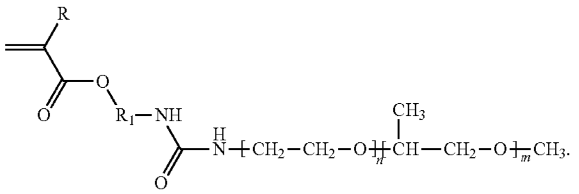

8 Claims, No Drawings

(56) References Cited

FOREIGN PATENT DOCUMENTS

| | | |
|---|---|---|
| JP | 2019-019155 | 2/2019 |
| JP | 2019-509369 | 4/2019 |
| JP | 2019-157077 | 9/2019 |
| WO | 2014/091923 | 6/2014 |

OTHER PUBLICATIONS

International Search Report, issued in the corresponding PCT application No. PCT/JP2021/029732 dated Nov. 9, 2021, 5 pages (including machine translation).

Taiwanese Office Action, issued in the corresponding Taiwanese patent application No. 110130990, dated Jan. 21, 2025, 10 pages with the machine translation.

* cited by examiner

PIGMENT DISPERSANT COMPOSITION, PRODUCTION METHOD THEREFOR, PIGMENT DISPERSION, AND ACTINIC-RAY-CURABLE INK-JET INK

TECHNICAL FIELD

The present invention relates to a pigment dispersant composition and a method for producing the same, a pigment dispersion, and an active energy ray-curable inkjet ink.

BACKGROUND ART

Products such as an ink, a paint, and a coating agent are usually coating liquids containing an organic solvent. For this reason, there has been a problem that these products has a high environmental load because the organic solvent volatilizes after coating with these products. In order to solve such a problem, environmentally friendly products that are substantially free from an organic solvent have been proposed. For example, there have been proposed an aqueous coating liquid containing water as a main medium, and powder painting using a colored resin powder. Further, for example, there have been proposed active energy ray-curable inks, such as an ultraviolet-curable ink and an electron beam-curable ink, which are coating liquids using a vinyl-based, epoxy-based, or oxetane-based monomer in place of an organic solvent, which form a coating film by polymerizing the monomer by heat or light after coating, and which are substantially free from a volatile component.

In recent years, ultraviolet-curable inkjet inks (UVIJ inks) which use a packaging material or a container as a substrate to be printed, which can give printed matter with brilliant color on-demand by directly sending an image from a personal computer, and which use pigments as colorants have been developed. In these UVIJ inks, properties, such as dispersion stability of pigments and ejection performance, need to be improved in order to support high-speed printing. That is, a pigment dispersion for a UVIJ ink, in which the pigment is finely dispersed in a stable manner, is needed.

In order to obtain such a pigment dispersion, polymer-type pigment dispersants having a high molecular weight are used in addition to pigment dispersants having a low molecular weight, such as surfactants. Among others, polymer type pigment dispersants obtained by polymerizing vinyl-based monomers are frequently used from the viewpoint of improving the dispersibility and dispersion stability of pigments. Note that such polymer type pigment dispersants are usually used in the form of solutions in which the pigment dispersants are dissolved and diluted in an organic solvent (Patent Literatures 1 and 2).

CITATION LIST

Patent Literature

Patent Literature 1: Japanese Patent Laid-Open No. 2019-157077

Patent Literature 2: Japanese Patent Laid-Open No. 2013-177580

SUMMARY OF INVENTION

Technical Problem

In a pigment dispersion prepared using any of the pigment dispersants proposed in Patent Literatures 1 and 2, and the like, an organic solvent is contained, so that an organic solvent is also contained in a UVIJ ink prepared using any of these pigment dispersions. To obtain an environmentally friendly pigment dispersant that is substantially free from a volatile component, such as an organic solvent, an operation of removing the organic solvent by distillation or the like from a polymer solution obtained through solution polymerization or the like is necessary. For this reason, there have been defects such as that a step of removing the organic solvent is necessary and that the processes are made complicated and cumbersome.

On the other hand, there are pigment dispersants, such as a polyester and a polyamide, which are obtained through polymerization without using an organic solvent. However, it is difficult to produce, by polymerization, a pigment dispersant containing a vinyl-based monomer as a main constituent unit without using a liquid medium, such as an organic solvent. Further, polymerization can be performed in a state of a 100% solid content, but a special kneader, such as an extruder endurable under a high-pressure/high-temperature condition, is necessary, and therefore there has been a problem that such polymerization lacks versatility.

The present invention has been completed in view of such problems of the conventional techniques, and an object of the present invention is to provide an environmentally friendly pigment dispersant composition that can be produced relatively easily. In this pigment dispersant composition, the content of a volatile component is significantly reduced even though the pigment dispersant composition contains a pigment dispersant mainly containing a constituent unit derived from a vinyl-based monomer, and a pigment dispersion and an ink which are excellent in pigment dispersability can be prepared using this pigment dispersant composition. Further, another object of the present invention is to provide a method for producing the above-described pigment dispersant composition, and a pigment dispersion and an active energy ray-curable inkjet ink which are obtained using the above-described pigment dispersant composition.

Solution to Problem

That is, according to the present invention, a pigment dispersant composition, described below, is provided.

[1] A pigment dispersant composition comprising: a polyglycol component that has at least one alkylene chain selected from the group consisting of $CH_2CH_2$, $CH_2CH(CH_3)$, and $CH_2CH_2CH_2CH_2$ and has a molecular weight of 1,000 or higher and 4,000 or lower; and a polymer component that has a number average molecular weight of 5,000 to 20,000 and that has 50 to 80% by mass of a constituent unit (1) derived from a macromonomer represented by the following formula (1) and having a molecular weight of 1,000 to 4,000, 5 to 25% by mass of a constituent unit (2) derived from at least one functional group-containing vinyl-based monomer selected from the group consisting of a carboxy group-containing vinyl-based monomer and an amino group-containing vinyl-based monomer, and 0 to 45% by mass of a constituent unit (3) derived from an additional monomer, wherein the polyglycol component is at least one selected from the group consisting of a polyalkylene glycol, a polyalkylene glycol monoalkyl (C1 to C18) ether, and a polyalkylene glycol dialkyl (C1 to C4) ether, and a content of an organic compound having a boiling point of 250° C. or lower is 1% by mass or less.

(1)

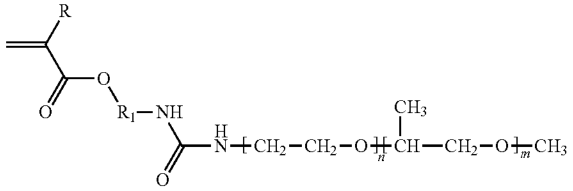

wherein R represents a hydrogen atom or a methyl group, $R_1$ represents $CH_2CH_2$ or $CH_2CH_2OCH_2CH_2$, and m+n=20 to 100.

[2] The pigment dispersant composition according to [1], wherein the polymer component further has 5% by mass or less of a constituent unit (4) derived from a chain transfer agent based on a total amount of the constituent unit (1), the constituent unit (2), and the constituent unit (3).

[3] The pigment dispersant composition according to [2], wherein the chain transfer agent is at least one selected from the group consisting of iodine, dodecanethiol, and thioglycerol, and a content of the constituent unit (4) in the polymer component is 0.5 to 3% by mass based on the total amount of the constituent unit (1), the constituent unit (2), and the constituent unit (3).

[4] The pigment dispersant composition according to any one of [1] to [3], wherein the carboxy group-containing vinyl-based monomer is at least one selected from the group consisting of (meth)acrylic acid, 2-(meth)acryloyloxyethyl succinate, 1-(meth)acryloyloxy phthalate, and 1-(meth)acryloyloxy-1,2,4-benzenetricarboxylic acid ester, the amino group-containing vinyl-based monomer is at least one selected from the group consisting of dimethylaminoethyl (meth)acrylate, diethylaminoethyl (meth)acrylate, 2-vinylpyridine, 4-vinylpyridine, and vinylimidazole, and the additional monomer is α-methylstyrene.

[5] The pigment dispersant composition according to any one of [1] to [4], wherein the polyglycol component is a liquid containing 30% by mass or more of a propylene oxide unit and having a viscosity at 25° C. of 2 Pas or lower.

In addition, according to the present invention, a method for producing a pigment dispersant composition, described below, is provided.

[6] A method for producing a pigment dispersant composition, the method being a method for producing the pigment dispersant composition according to any one of [1] to [5] and comprising a step of polymerizing a monomer component comprising the macromonomer and the functional group-containing vinyl-based monomer using the polyglycol component as a polymerization solvent at a temperature of 50° C. or higher in the presence of a radical generator.

Further, according to the present invention, a pigment dispersion and an active energy ray-curable inkjet ink, which are described below, are provided.

[7] A pigment dispersion to be used for producing an active energy ray-curable inkjet ink, wherein the pigment dispersion comprises: the pigment dispersant composition according to any one of [1] to [5]; a pigment; and a photopolymerizable monomer.

[8] An active energy ray-curable inkjet ink comprising: the pigment dispersion according to [7]; and a photopolymerization initiator.

Advantageous Effects of Invention

The present invention can provide an environmentally friendly pigment dispersant composition that can be produced relatively easily. In this pigment dispersant composition, the content of a volatile component is significantly reduced even though the pigment dispersant composition contains a pigment dispersant mainly containing a constituent unit derived from a vinyl-based monomer, and a pigment dispersion and an ink which are excellent in pigment dispersability can be prepared using this pigment dispersant composition. Further, the present invention can provide a method for producing the above-described pigment dispersant composition, and a pigment dispersion and an active energy ray-curable inkjet ink which are obtained using the above-described pigment dispersant composition.

DESCRIPTION OF EMBODIMENTS

<Pigment Dispersant Composition>

Hereinafter, embodiments of the present invention will be described, but the present invention is not limited to the following embodiments. One embodiment of a pigment dispersant composition of the present invention contains a polyglycol component having a molecular weight of 1,000 or higher and 4,000 or lower and a polymer component having a number average molecular weight of 5,000 to 20,000. The polyglycol component has at least one alkylene chain selected from the group consisting of $CH_2CH_2$, $CH_2CH(CH_3)$, and $CH_2CH_2CH_2CH_2$, and is at least one selected from the group consisting of a polyalkylene glycol, a polyalkylene glycol monoalkyl (C1 to C18) ether, and a polyalkylene glycol dialkyl (C1 to C4) ether. In addition, the polymer component has 50 to 80% by mass of a constituent unit (1) derived from a macromonomer represented by the following formula (1) and having a molecular weight of 1,000 to 4,000, 5 to 25% by mass of a constituent unit (2) derived from at least one functional group-containing vinyl-based monomer selected from the group consisting of a carboxy group-containing vinyl-based monomer and an amino group-containing vinyl-based monomer, and 0 to 45% by mass of a constituent unit (3) derived from an additional monomer. Then, in the pigment dispersant composition of the present embodiment, the content of an organic compound having a boiling point of 250° C. or lower is 1% by mass or less, preferably 0.5% by mass or less. Hereinafter, details on the pigment dispersant composition of the present embodiment will be described.

(1)

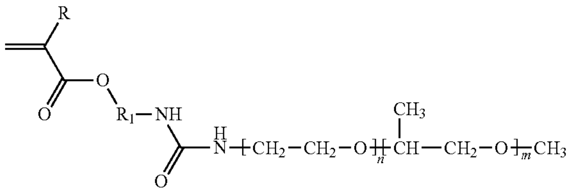

wherein R represents a hydrogen atom or a methyl group, $R_1$ represents $CH_2CH_2$ or $CH_2CH_2OCH_2CH_2$, and m+n=20 to 100.

(Polyglycol Component)

The pigment dispersant composition of the present embodiment is a composition that can be obtained by polymerizing particular monomers in the polyglycol component (hereinafter, also referred to as "polymer (1)") and thereby forming the polymer component (hereinafter, also referred to as "polymer (2)"), and is a composition containing a polyglycol component and a polymer component that functions as a pigment dispersant, preferably a composition substantially consisting of the polyglycol component and the polymer component. That is, the polyglycol component (polymer (1)) is a component that functions as a polymerization solvent, that improves the wettability and leveling properties of a pigment, the flexibility of a coating film, and the pigment dispersibility, and that can function as a pigment dispersion assistant. Since the polymer (1) is a component that can also function as a polymerization solvent, it is preferable that the polymer (1) is in a liquid state within a range of room temperature (25° C.) to polymerization temperature and have a viscosity that makes it easy to mix and stir the polymer (1) even in a state of containing the polymer component (polymer (2)). Specifically, the viscosity of the polymer (1) at 25° C. is preferably 10 Pas or lower.

The polymer (1) is the polyglycol component that has at least one alkylene chain selected from the group consisting of $CH_2CH_2$, $CH_2CH(CH_3)$, and $CH_2CH_2CH_2CH_2$ and has a molecular weight of 1,000 or higher and 4,000 or lower, preferably 2,000 to 3,000. When the molecular weight of the polymer (1) is lower than 1,000, a volatile component having a low molecular weight is contained in some cases. On the other hand, when the molecular weight of the polymer (1) is higher than 4,000, the viscosity is excessively high in some cases, and the polymer (1) is not in a liquid state within the range of room temperature (25° C.) to polymerization temperature in some cases. The molecular weight of the polymer (1) means a number average molecular weight calculated from the hydroxyl value of the polymer (1).

The polymer (1) is at least one selected from the group consisting of a polyalkylene glycol, a polyalkylene glycol monoalkyl (C1 to C18) ether, and a polyalkylene glycol dialkyl (C1 to C4) ether. Examples of the polyalkylene glycol include polyethylene glycol, polypropylene glycol, polytetramethylene glycol, a polyethylene glycol polypropylene glycol random copolymer, a polyethylene glycol polytetramethylene glycol random copolymer, a polypropylene glycol polytetramethylene glycol random copolymer, a polyethylene glycol polypropylene glycol polytetramethylene glycol random copolymer, a polyethylene glycol polypropylene glycol block copolymer, a polypropylene glycol polyethylene glycol polypropylene glycol triblock copolymer, and a polyethylene glycol polypropylene glycol polyethylene glycol triblock copolymer.

The polyalkylene glycol monoalkyl (C1 to C18) ether is obtained by etherifying a hydroxy group at one end of the above-described polyalkylene glycol with a C1 to C18 alkyl group. Examples of the C1 to C18 alkyl group include a methyl group, an ethyl group, a propyl group, a butyl group, a hexyl group, an octyl group, a 2-ethylhexyl group, a nonyl group, a decyl group, a dodecyl group, a cetyl group, an octadecyl group, and a behenyl group.

The polyalkylene glycol dialkyl (C1 to C4) ether is obtained by etherifying hydroxy groups at both ends of the above-described polyalkylene glycol with a C1 to C4 alkyl group. The C1 to C4 alkyl groups at both ends may be the same or different. Examples of the C1 to C4 alkyl group include a methyl group, an ethyl group, a propyl group, and a butyl group.

The polyglycol component (polymer (1)) is preferably a liquid containing 30% by mass or more, more preferably 50 to 80% by mass, of a propylene oxide unit. In addition, the polyglycol component (polymer (1)) is preferably a liquid having a viscosity at 25° C. of 2 Pas or lower, more preferably a liquid having a viscosity at 25° C. of 2 Pas or lower. The polymer (1) in which the content of an ethylene oxide unit or a tetramethylene oxide unit is large is likely to solidify, and therefore the handling properties tend to be lowered. On the other hand, the polymer (1) in which the content of the propylene oxide unit is large is unlikely to solidify and therefore is likely to be liquid even at room temperature, so that such a polymer (1) is excellent in handling properties. The viscosity of the polyglycol component (polymer (1)) at 25° C. is a value which is measured by a method in which a B-type viscometer is used and a rotor to match the viscosity is used.

The polymer (1) can be produced by a conventionally known method. For example, by polymerizing monomers, such as ethylene oxide, propylene oxide, and tetrahydrofuran, using a pressure resistant container or the like in the presence of an initiator and a catalyst while cooling the monomers at room temperature (25° C.) to 200° C., the polymer (1) can be obtained. As the initiator, ethylene glycol, propylene glycol, or the like can be used. As the catalyst, an alkali metal, such as sodium hydroxide or potassium methylate, can be used.

(Polymer Component)

The polymer component (polymer (2)) is a component that functions as a pigment dispersant for dispersing a pigment in a liquid medium and has 50 to 80% by mass, preferably 55 to 75% by mass, of a constituent unit (1) derived from a macromonomer represented by formula (1). The polymer (2) contains a large amount of a constituent unit (1) derived from a macromonomer having a structure similar to the polymer (1) and therefore is likely to be compatible with the polymer (1), so that a pigment dispersant composition which is a uniform mixed solution can be made. In addition, the polymer (2) has a main chain having functional groups of a carboxy group and an amino group, and a graft chain grafted onto the main chain and formed of a constituent unit (1) derived from the macromonomer. When the main chain having the functional groups adsorbs onto a pigment and the graft chain dissolves in a dispersion medium, thereby pigment particles can be repulsed and the storage stability of a pigment dispersion, an ink, or the like can be enhanced. In addition, the polymer (2) contains a large amount of a constituent unit (1) derived from the macromonomer, and therefore the density of the graft chains is high, so that the dispersion stability of the pigment can be enhanced by steric repulsion.

The macromonomer is a monomer represented by the following formula (1) and having a molecular weight of 1,000 to 4,000, preferably 2,000 to 3,500.

(1)

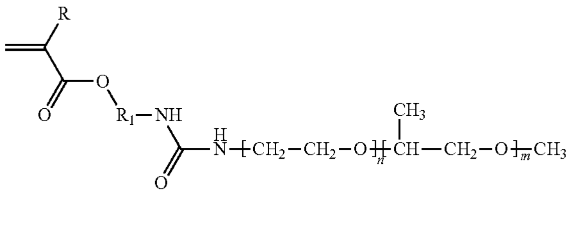

wherein R represents a hydrogen atom or a methyl group, $R_1$ represents $CH_2CH_2$ or $CH_2CH_2OCH_2CH_2$, and m+n=20 to 100.

In formula (1), m+n=20 to 100, preferably m+n=30 to 75. When the value of m+n is less than 20, sufficient steric hindrance cannot be obtained, making it difficult to enhance the dispersion stability of the pigment. On the other hand, when the value of m+n is larger than 100, the molecular weight is excessively large, and therefore the viscosity of the pigment dispersant composition, or the viscosity of a pigment dispersion which is obtained using the pigment dispersant composition is likely to increase excessively, so that the handling properties are lowered. The ratio between m and n is not particularly limited, but it is preferable that a relationship of m>n be satisfied, that is, a relatively larger amount of an oxypropylene unit be contained. The macromonomer satisfying the relationship of m>n is likely to be in a liquid state, so that the handling properties are improved.

The macromonomer can be produced by a conventionally known method. For example, by reacting a (meth)acrylate monomer having an isocyanate group with a polyalkylene glycol monomethyl ether having an amino group at one end thereof, the macromonomer can be produced. Examples of the (meth)acrylate monomer having an isocyanate group include acryloyloxyethyl isocyanate, methacryloyloxyethyl isocyanate, acryloyloxyethoxyethyl isocyanate, and methacryloyloxyethoxyethyl isocyanate. The above-described reaction is preferably performed under a solventless condition because a resultant macromonomer is substantially free from a low-boiling-point solvent.

The polymer (2) has 5 to 25% by mass, preferably 10 to 20% by mass, of a constituent unit (2) derived from at least one functional group-containing vinyl-based monomer selected from the group consisting of a carboxy group-containing vinyl-based monomer and an amino group-containing vinyl-based monomer. A polymer chain having a functional group containing this constituent unit (2) adsorbs onto a pigment particle which is to be dispersed. When the content of the constituent unit (2) in the polymer (2) is less than 5% by mass, the amount of the functional group is insufficient, so that the absorptivity onto the pigment is lowered. On the other hand, when the content of the constituent unit (2) in the polymer (2) is larger than 5% by mass, the amount of the functional group is excessively large, so that chemical resistance, such as water fastness and acid resistance/alkali resistance, is lowered.

Examples of the carboxy group-containing vinyl-based monomer include styrene carboxylic acid, (meth)acrylic acid, acrylic acid dimer, 2-(meth)acryloyloxyethyl succinate, 2-(meth)acryloyloxypropyl succinate, 2-(meth)acryloyloxybutyl phthalate, 2-(meth)acryloyloxyethyl maleate, 1-(meth)acryloyloxy phthalate, 1-(meth)acryloyloxy-1,2,4-benzenetricarboxylic acid ester, and 1-(meth)acryloyloxy-1,2,4-naphthalenetricarboxylic acid ester. Among these, the carboxy group-containing vinyl-based monomer is preferably (meth)acrylic acid, 2-(meth)acryloyloxyethyl succinate, 1-(meth)acryloyloxy phthalate, or 1-(meth)acryloyloxy-1,2,4-benzen tricarboxylic acid ester from the viewpoint of versatility, availability, easiness of synthesis, affinity with pigments, and the like.

Examples of the amino group-containing vinyl-based monomer include dimethylaminoethyl (meth)acrylate, diethylaminoethyl (meth)acrylate, t-butylaminoethyl (meth) acrylate, 2-vinylpyridine, 4-vinylpyridine, vinylimidazole, and dimethylaminopropyl (meth)acrylamide. Among these, the amino group-containing vinyl-based monomer is preferably dimethylaminoethyl (meth)acrylate, diethylaminoethyl (meth)acrylate, 2-vinylpyridine, 4-vinylpyridine, or vinylimidazole from the viewpoint of versatility, availability, easiness of synthesis, affinity with pigments, and the like.

As the functional group-containing vinyl-based monomer, only a carboxy group-containing vinyl-based monomer may be used, or only an amino group-containing vinyl-based monomer may be used. Further, a carboxy group-containing vinyl-based monomer and an amino group-containing vinyl-based monomer may be used in combination.

The polymer (2) preferably has 0 to 45% by mass, more preferably 5 to 40% by mass, of a constituent unit (3) derived from an additional monomer other than the above-described macromonomer and functional group-containing vinyl-based monomer. Examples of the additional monomer include: monofunctional (meth)acrylates having a functional group, such as a methyl group, an ethyl group, a propyl group, a butyl group, an amyl group, a 2-ethylhexyl group, an isooctyl group, a nonyl group, a dodecyl group, a hexadecyl group, an octadecyl group, an isostearyl group, a behenyl group, a cyclohexyl group, a trimethylcyclohexyl group, a t-butylcyclohexyl group, a benzyl group, a methoxyethyl group, a butoxyethyl group, a phenoxyethyl group, a nonylphenoxyethyl group, a glycidyl group, an isobornyl group, a dicyclopentanyl group, a dicyclopentenyl group, a dicyclopentenyloxyethyl group, a 2-hydroxyethyl group, a 2-hydroxypropyl group, or a 4-hydroxybutyl group; polymer type (meth)acrylates which are macromonomers, such as a poly(n=2 or more)alkylene (C2 to C4) glycol mono(meth)acrylate, a poly(n=2 or more)alkylene (C2 to C4) glycol monoalkyl (C1 to C22) mono(meth)acrylate, and a poly(n=2 or more)hydroxy alkanoic acid (C5 to C18) mono(meth)acrylate; and vinyl monomers, such as styrene, vinyltoluene, vinylpyridine, vinylcaprolactone, α-methylstyrene, 2,4-diphenyl-1-butene, 2,4-diphenyl-4-methyl-1-pentene, and vinyl acetate.

In the case where the polymer (1) is used as the polymerization solvent and particular monomers are polymerized in this polymer (1) to synthesize the polymer (2), when the molecular weight of the produced polymer (2) is excessively high, the viscosity of a resultant pigment dispersant composition is excessively high, and therefore the pigment dispersant composition may be likely to solidify. In addition, the polymerization rate is excessively high, and therefore a low-molecular-weight monomer is preferentially polymerized, so that the macromonomer may be likely to be left. Here, α-methylstyrene is preferably used as the additional monomer because polymerization can be suppressed moderately and controlled.

A chain transfer agent is preferably used in obtaining the polymer (2) by polymerization. By using a chain transfer agent, the polymerization reaction can be controlled and an excessive increase in the molecular weight of the polymer (2) to be produced can be suppressed.

As the chain transfer agent, a conventionally known chain transfer agent can be used. Examples of the chain transfer agent include: thiol-based compounds, such as hydroxyethylthiol, octylthiol, dodecylthiol, stearylthiol, and thioglycerol; α-substituted acrylate compounds, such as bromomethylacrylic acid, ethyl bromomethylacrylate, and ethyl benzylmethylacrylate; halogen compounds, such as iodetrichloromethane, and iodine; trithiocarbonates, such as S,S-dibenzyl trithiocarbonate, methyl cyano isopropyl trithiocarbonate; and thioesters, such as 2-cyanopropyldithiobenzoate. Among these, iodine, dodecanethiol, and thioglycerol, which have weak odor and have a high boiling point, are preferable.

By using a chain transfer agent in obtaining the polymer (2) by polymerization, the constituent unit (4) derived from the chain transfer agent is contained in the polymer (2). The content of the constituent unit (4) in the polymer (2) is preferably 5% by mass or less, more preferably 0.5 to 3% by mass, and particularly preferably 1 to 2.5% by mass or less, based on the total amount of the constituent unit (1), the constituent unit (2), and the constituent unit (3). When the content of the constituent unit (4) derived from the chain transfer agent in the polymer (2) is excessively large, the molecular weight of the polymer (2) may be excessively low. In addition, odor and coloration may be likely to occur.

The number average molecular weight of the polymer component (polymer (2)) is 5,000 to 20,000, preferably 7,000 to 15,000. When the number average molecular weight of the polymer (2) is lower than 5,000, the dispersion stability of a pigment may be insufficient. On the other hand, when the number average molecular weight of the polymer (2) is higher than 20,000, the viscosity of the pigment dispersant composition or the pigment dispersion is excessively high, so that the handling properties may be lowered. The number average molecular weight of the polymer (2) is a value in terms of polystyrene, which is measured by gel permeation chromatography (GPC). Note that the content of the polymer component (polymer (2)) in the pigment dispersant composition is preferably 30 to 70% by mass, more preferably 40 to 70% by mass.

<Method for Producing Pigment Dispersant Composition>

One embodiment of a method for producing a pigment dispersant composition of the present invention is a method for producing the above-described pigment dispersant composition in which the content of an organic compound having a boiling point of 250° C. or lower is 1% by mass or less, preferably a method for producing the above-described pigment dispersant composition substantially free from an organic compound having a boiling point of 250° C. or lower. This embodiment includes a step (polymerization step) of polymerizing a monomer component containing the macromonomer and the functional group-containing vinyl-based monomer using the polyglycol component (polymer (1)) as a polymerization solvent at a temperature of 50° C. or higher in the presence of a radical generator.

In the polymerization step, the monomer component containing the macromonomer and the functional group-containing vinyl-based monomer is polymerized using the polymer (1) as the polymerization solvent. By polymerizing the monomer component, the polymer component (polymer (2)) is formed, and the intended pigment dispersant composition in which the polymer (1) and the polymer (2) are contained and the content of the organic compound having a boiling point of 250° C. or lower is 1% by mass or less can be obtained. If necessary, the additional monomer and a chain transfer agent can be used as the monomer component. Note that the polymerization reaction system containing the polymer (1) as the polymerization solvent and the monomer component is in a liquid state.

As the radical generator, azo-based radical generators, such as azobisisobutyronitrile; peroxides, such as benzoyl peroxide; and the like can be used. A reaction solution containing the polymer (1), the monomer component, and the radical generator is heated to a temperature equal to or higher than the decomposition temperature of the radical generator, at which the reaction solution can easily be stirred, specifically the reaction solution is heated to 50° C. or higher to perform the polymerization. When the temperature during the polymerization is lower than 50° C., the decomposition rate of the radical generator is low, and therefore the molecular weight of the resultant polymer component (polymer (2)) is excessively high, and the monomer component is likely to be left. In addition, the viscosity of the reaction solution becomes excessively high, so that stirring may be difficult. The temperature during the polymerization is preferably set to 60 to 100° C.

The content of the monomer component in the reaction solution is preferably set to 30 to 70% by mass, more preferably 40 to 70% by mass. By setting the content of the monomer component in the reaction solution to the above-described range, the reaction solution is likely to be stirred efficiently, and the residual amount of the monomer component can be reduced.

Among the components that may be contained in the resultant pigment dispersant composition, part of residual monomers corresponds to an organic compound having a boiling point of 250° C. or lower. In the method for producing a pigment dispersant composition of the present embodiment, the polymerization reaction is controlled so as not leave the organic compound having a boiling point of 250° C. or lower, such as a residual monomer, by allowing the polymerization reaction to progress sufficiently. For example, the polymerization reaction may be allowed to progress while the amount of the residual monomers in the reaction solution is monitored by gas chromatography (GC) or the like. Thereby, the intended pigment dispersant composition in which the content of the organic compound having a boiling point of 250° C. or lower is reduced as much as possible can be obtained. Note that when the polymer (1) and the polymer (2) are water-soluble polymers, the pigment dispersant composition may be diluted with water. Thereby, an environmentally friendly aqueous pigment dispersant composition that is substantially free from the organic compound having a boiling point of 250° C. or lower can be made.

The pigment dispersant composition of the present embodiment is useful as a pigment dispersant for producing various types of products, such as, for example, a paint, an ink such as an aqueous inkjet ink, a gravure ink, and a coating agent. Among others, the pigment dispersant composition of the present embodiment is substantially free from a volatile component and therefore is suitable as a pigment dispersant for producing an active energy ray-curable ink, such as an ultraviolet-curable ink or an electron beam-curable ink, in which all the components are coating film components. Particularly, the pigment dispersant composition of the present embodiment is suitable as a pigment dispersant for producing an active energy ray-curable inkjet ink because a pigment can be finely dispersed therein and the storage stability is high.

<Pigment Dispersion>

A pigment dispersion that is one embodiment of the present invention is a pigment dispersion to be used for producing an active energy ray-curable inkjet ink and contains the above-described pigment dispersant composition, a pigment, and a photopolymerizable monomer.

Examples of the pigment, when shown by Color Index (C.I.) number, include: C.I. Pigment yellow 12, 13, 14, 17, 20, 24, 74, 83, 86, 93, 94, 95, 97, 109, 110, 117, 120, 125, 128, 129, 137, 138, 139, 147, 148, 150, 151, 153, 154, 155, 166, 168, 175, 180, 181, 185, and 191; C.I. Pigment Orange 16, 36, 43, 51, 55, 59, 61, 64, 71, and 73; C.I. Pigment Red 4, 5, 9, 23, 48, 49, 52, 53, 57, 97, 112, 122, 123, 144, 146, 147, 149, 150, 166, 168, 170, 176, 177, 180, 184, 185, 192, 202, 207, 214, 215, 216, 217, 220, 221, 223, 224, 226, 227, 228, 238, 240, 242, 254, 255, 264, 269, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7, 36, and 58; C.I. Pigment Black 7; and C.I. Pigment White 6.

Among these, from the viewpoint of color developability, dispersibility, weatherability, and the like, yellow pigments, such as C.I. Pigment Yellow 74, 83, 109, 128, 139, 150, 151, 154, 155, 180, 181, and 185; red pigments, such as C.I. Pigment Red 122, 170, 176, 177, 185, and 269, and C.I. Pigment Violet 19 and 23; blue pigments, such as C.I. Pigment Blue 15:3, 15:4, and 15:6; black pigments, such as C.I. Pigment Black 7; and white pigments, such as C.I. Pigment White 6, are suitable as pigments for inkjet inks.

The pigment may be an untreated pigment, may be a self-dispersible pigment having a functional group introduced on the surface thereof, or may be a treated pigment which has been surface-treated or encapsulated with a surface treating agent, such as a coupling agent or a surfactant, or with a polymer. In addition, the pigment is preferably an organic fine particle pigment except for the cases where hiding power is required. Further, in the cases where a high-definition image having a favorable transparency is recorded, a pigment micronized by wet pulverization, such as salt milling, or by dry pulverization is preferably used. A pigment having an average particle size of 0.2 μm or smaller or an inorganic pigment having an average particle size of 0.4 μm or smaller, obtained by removing large particles having a particle size of larger than 1.0 μm, is preferably used in view of, for example, avoiding nozzle clogging during printing.

As the photopolymerizable monomer, curable components, such as a monofunctional monomer, a polyfunctional monomer, a photo-curable oligomer, and a photo-curable polymer, can be used. Examples of the monofunctional monomer include radically polymerizable monomers, such as methyl (meth)acrylate, ethyl (meth)acrylate, butyl (meth) acrylate, n-butyl (meth)acrylate, isobutyl (meth)acrylate, t-butyl (meth)acrylate, hexyl (meth)acrylate, cyclohexyl (meth)acrylate, trimethylcyclohexyl (meth)acrylate, t-butylcyclohexyl (meth)acrylate, 2-ethylhexyl (meth)acrylate, isodecyl (meth)acrylate, lauryl (meth)acrylate, stearyl (meth) acrylate, isobornyl (meth)acrylate, dicyclopentenyl (meth) acrylate, adamantyl (meth)acrylate, adamantyl methyl (meth)acrylate, 2-hydroxyethyl (meth)acrylate, 2-hydroxypropyl (meth)acrylate, 4-hydroxybutyl (meth)acrylate, glycidyl (meth)acrylate, dimethylaminoethyl (meth)acrylate, diethylaminoethyl (meth)acrylate, polyethylene glycol mono(meth)acrylate, polyethylene glycol monomethyl ether (meth)acrylate, 2-ethoxyethyl (meth)acrylate, tetrahydrofurfuryl (meth)acrylate, allyl (meth)acrylate, vinyloxyethoxyethyl (meth)acrylate, benzyl (meth)acrylate, phenoxyethyl (meth)acrylate, an adduct of phthalic anhydride and 2-hydroxyethyl (meth)acrylate, and acryloyl morpholine.

Examples of the polyfunctional monomer and the photo-curable oligomer include: neopentyl glycol di(meth)acrylate, ethylene glycol di(meth)acrylate, poly(n=2 or more) ethylene glycol di(meth)acrylate, polypropylene glycol (n=2 or more) di(meth)acrylate, polybutylene glycol (n=2 or more) di(meth)acrylate, 2,2-bis(4-(meth)acryloxyethoxyphenyl)propane, 2,2-bis(4-(meth)acryloxydiethoxyphenyl) propane, trimethylolpropane diacrylate, bis(2-(meth)acryloxyethyl)-hydroxyethyl-isocyanurate, trimethylolpropane tri(meth)acrylate, tris(2-(meth)acryloxyethyl) isocyanurate, pentaerythritol tri(meth)acrylate, pentaerythritol tetra(meth) acrylate, dipentaerythritol tetra(meth)acrylate, dipentaerythritol penta(meth)acrylate, and dipentaerythritol hexa(meth) acrylate; epoxy poly(meth)acrylates, such as an epoxy di(meth)acrylate obtained by reacting bisphenol A diepoxy and (meth)acrylic acid; urethane poly(meth)acrylates, such as a urethane tri(meth)acrylate obtained by reacting 1,6-hexamethylene diisocyanate trimer and 2-hydroxyethyl (meth)acrylate, a urethane di(meth)acrylate obtained by reacting isophorone diisocyanate and 2-hydroxypropyl (meth)acrylate, a urethane hexa(meth)acrylate obtained by reacting isophorone diisocyanate and pentaerythritol tri (meth)acrylate, a urethane di(meth)acrylate obtained by reacting dicyclohexyl diisocyanate and 2-hydroxyethyl (meth)acrylate, and a urethane di(meth)acrylate obtained by reacting a urethanization reaction product between dicyclohexyl diisocyanate and poly(n=6 to 15)tetramethylene glycol with 2-hydroxyethyl (meth)acrylate; and polyester poly (meth)acrylates such as a polyester (meth)acrylate obtained by reacting trimethylolethane, succinic acid, and (meth) acrylic acid, a polyester (meth)acrylate obtained by reacting trimethylolpropane, succinic acid, ethylene glycol, and (meth)acrylic acid.

Examples of the photo-curable polymer include polymers obtained by introducing a plurality of (meth)acryloyloxy groups, which are radically polymerizable groups, at an end or in a side chain of a polymer, such as a poly(meth)acrylate, polyurethane, polyester, polyamide, polyimide, or polyepoxy resin. Further, photo-curable polymers which have a carboxy group or the like and which are allowed to have alkali developability can also be used.

The content of the pigment, when the pigment is an organic pigment, in the pigment dispersion is preferably 1 to 30% by mass, more preferably 10 to 25% by mass. In addition, the content of the pigment, when the pigment is an inorganic pigment, in the pigment dispersion is preferably 5 to 70% by mass, more preferably 30 to 50% by mass. The content of the polymer component (polymer (2)) in the pigment dispersion is preferably 5 to 100 parts by mass, more preferably 7.5 to 50 parts by mass, based on 100 parts by mass of the pigment. When the content of the polymer (2) is less than 5 parts by mass based on 100 parts by mass of the pigment, the dispersion stability of the pigment may be insufficient. On the other hand, when the content of the polymer (2) is larger than 100 parts by mass based on 100 parts by mass of the pigment, the viscosity may be likely to increase excessively, the ejection performance of the inkjet ink may be likely to be lowered, and the physical properties and durability of a coating film to be formed may be lowered.

The pigment dispersion of the present embodiment can be produced by a conventionally known method. The pigment dispersion can be prepared by, for example, putting a mixture containing the pigment, the pigment dispersant composition, and the photopolymerizable monomer into a paint shaker, a ball mill, an attritor, a sand mill, a horizontal media mill, a colloid mill, a roll mill, or the like and finely dispersing the pigment. Note that coarse particles are preferably removed using a centrifugal separator or a filter. If necessary, an additional additive may be added.

The viscosity of the pigment dispersion may appropriately be adjusted in view of the characteristics of the pigment, the viscosity of the active energy ray-curable inkjet ink intended to be produced, and the like. Specifically, in the case where an organic pigment is used, the viscosity of the pigment dispersion is preferably 2 to 50 mPa·s. In addition, in the case where an inorganic pigment is used, the viscosity of the pigment dispersion is preferably 5 to 100 mPa·s.

<Active Energy Ray-Curable Inkjet Ink>

An active energy ray-curable inkjet ink (hereinafter, also simply referred to as "ink") that is one embodiment of the present invention contains the above-described pigment dispersion and a photopolymerization initiator.

Examples of the photopolymerization initiator include: carbonyl compounds, such as benzoin, benzoin monomethyl ether, benzoin isopropyl ether, acetoin, benzil, benzophenone, p-methoxybenzophenone, diethoxyacetophenone, benzyl dimethyl ketal, 2,2-diethoxyacetophenone, 1-hydroxycyclohexyl phenyl ketone, methylphenyl glyoxylate, and 2-hydroxy-2-methyl-1-phenylpropan-1-one; sulfur compounds, such as tetramethylthiuram monosulfide, and tetramethylthiuram disulfide; phosphoric acid compounds, such as 2,4,6-trimethylbenzoyl diphenyl phosphine oxide, 2,4,6-trimethylbenzoylphenylethoxy phosphine oxide, bis (2,4,6-trimethylbenzoyl)-phenyl phosphine oxide, and bis(2, 6-dimethoxybenzoyl)-2,4,4-trimethyl-pentyl phosphine oxide; 2-benzyl-2-dimethylamino-1-(4-morpholinophenyl) butanone-1; and camphorquinone. The type of the photopolymerization initiator may be selected according to the wavelength of irradiation light.

The ink can further contain a component (additional additive) other than the pigment dispersion and the photopolymerization initiator. Examples of the additional additive include a light stabilizer, such as a nitroxide compound, an antioxidizing agent, such as hindered phenol, a dye, a fluorescent brightener, a leveling agent, a defoamer, a lubricant, a thickener, an antistatic agent, a surfactant, a silane coupling agent, a yellowing inhibitor, a bluing agent, an infrared absorber, an adhesion promotor, an antifouling agent, a water repellent, a curing catalyst, an inorganic filler, such as silica, and a fine metal particle. However, it is preferable not to use an organic compound having a boiling point of 250° C. or lower as the additional additive.

EXAMPLES

Hereinafter, the present invention will specifically be described based on Examples, but the present invention is not limited to those Examples. Note that "parts" and "%" in Examples and Comparative Examples are on a mass basis unless otherwise noticed.

<Production of Pigment Dispersant Composition>

Example 1

(a) Synthesis of Macromonomer

In a reaction container, 100 parts (0.05 mol) of a one-end-aminated polypropylene glycol polyethylene glycol (PPG/PEG) monomethyl ether copolymer (trade name "JEFFAMINE M2005," manufactured by Huntsman Corporation, amine value (measured value) 28.05 mgKOH/g) (M2005) was placed. Into the reaction container, 7.76 parts (0.05 mol) of 2-isocyanatoethyl methacrylate (trade name "Karenz MOI," manufactured by Showa Denko K.K.) (MOI) was dropped over 30 minutes while the reaction container was cooled with water. After the dropping, part of the reaction solution was sampled to ascertain that isocyanate groups derived from MOI had disappeared almost completely and urea bonds had been produced by infrared spectroscopy (IR). Thereby, it was ascertained that macromonomer MA-1 represented by formula (1) had been produced. The number average molecular weight (Mn) in terms of polystyrene and polydispersity index (PDI=Mw (weight average molecular weight)/Mn (number average molecular weight)) of macromonomer MA-1, as measured by gel permeation chromatography (GPC) using tetrahydrofuran (THF) as a developing solvent, were 3,500 and 1.19, respectively. In addition, the amine value of macromonomer MA-1 was not able to be measured with an automatic potentiometric titrator using a 0.1 mol/L 2-propanolic hydrochloric acid solution.

(b) Synthesis of Pigment Dispersant (Polymer (2))

To the above-described reaction container, 139.6 parts of a polypropylene glycol polyethylene glycol monobutyl ether copolymer (trade name "UNI LUB 50 MB-11," manufactured by NOF CORPORATION, hydroxyl value 56.1 mgKOH/g, molecular weight calculated from hydroxyl value 1,000) (50 MB-11), 20.0 parts of methyl methacrylate (MMA), 10.0 parts of methacrylic acid (MAA), and 1.5 parts of 1-thioglycerol (TGL) were added. The resultant mixture was heated to 70° C. under nitrogen bubbling, and then 0.2 parts of 2,2'-azobis(dimethyl isobutyrate) (trade name "V-601," manufactured by FUJIFILM Wako Pure Chemical Corporation) (V-601) was added thereto to perform polymerization for 4 hours. Further, 0.1 parts of V-601 was added to perform polymerization at 70° C. for 4 hours, and thus the polymer (2), which is a pigment dispersant, was formed to obtain pigment dispersant composition COV-1 in which the content of the pigment dispersant (polymer (2)) was 50%. Mn and PDI of the formed polymer (2) were 13,500 and 2.10, respectively. Both of the contents of residual monomers (MMA and MAA), as determined by head space gas chromatography/mass spectroscopy (HS-GCMS), were less than 0.2%, and the content of the other organic compounds having a boiling point of 250° C. or lower was less than 0.1%. The amounts of the residual monomers were determined by a measurement method in accordance with ISO 17895 on the measurement of a volatile organic compound in a paint. The acid value of the polymer (2), as measured by neutralization titration using a 0.1 mol/L ethanolic potassium hydroxide solution, was 46.5 mgKOH/g.

Examples 2 to 5

Pigment dispersant compositions COV-2 to 5 were obtained in the same manner as in Example 1 described above except that the combinations shown in Table 1 were adopted. It was ascertained that the content of organic compounds having a boiling point of 250° C. or lower was 1% or less for any of the pigment dispersant compositions. The meanings of abbreviations in Table 1 are as described below.

MB-38: polypropylene glycol monobutyl ether, trade name "UNI LUB MB-38," manufactured by NOF CORPORATION DMPEG: polyethylene glycol dimethyl ether STE: polypropylene glycol polyethylene glycol monostearyl ether, trade name "BLAUNON SA-30/70 2000R," manufactured by AOKI OIL INDUSTRIAL Co., Ltd.

50 MB-72: polypropylene glycol polyethylene glycol monobutyl ether, trade name "UNI LUB 50 MB-72," manufactured by NOF CORPORATION M41: one-end-aminated polypropylene glycol polyethylene glycol monomethyl ether copolymer, trade name "Genamin M41/2000," manufactured by Clariant AG BzMA: benzyl methacrylate CHMA: cyclohexyl methacrylate HOMS: 2-methacryloyloxyethyl succinate PAMA: 1-methacryloyloxyethyl phthalate TMA: addition reaction product of trimellitic anhydride and 2-hydroxyethyl methacrylate

TABLE 1

| | | | Example 1 | Example 2 | Example 3 | Example 4 | Example 5 |
|---|---|---|---|---|---|---|---|
| Pigment dispersant composition | | | COV-1 | COV-2 | COV-3 | COV-4 | COV-5 |
| Solvent | Name | | 50MB-11 | MB-38 | DMPEG | STE | 50MB-72 |
| | Composition | | PPG/PEG monobutyl ether | PPG monobutyl ether | PEG dimethyl ether | PPG/PE monostearyl ether | PPG/PEG monobutyl ether |
| | Molecular weight | | 1,000 | 1,900 | 2,000 | 2,000 | 3,000 |
| | Amount (parts) | | 139.6 | 159 | 152.6 | 201 | 147 |
| Macromonomer | Name | | MA-1 | MA-1 | MA-2 | MA-2 | MA-3 |
| | One-end- | Name | M2005 | M2005 | M41 | M41 | M3085 |
| | aminated | Amount (parts) | 100 | 100 | 100 | 100 | 100 |
| | PPG/PEG | Composition | PPG/PEG | PPG/PEG | PPG/PEG | PPG/PEG | PPG/PEG |
| | copolymer | Compositional ratio (molar ratio) | 29/6 | 29/6 | 1/4 | 1/4 | 8/58 |
| | MOI (parts) | | 7.76 | 7.76 | 7.82 | 7.82 | 5.17 |
| | Mn | | 3,500 | 3,500 | 3,300 | 3,300 | 3,900 |
| | PDI | | 1.19 | 1.19 | 1.16 | 1.16 | 1.17 |
| Main chain | Additional | MMA | 20 | | 20 | | 10 |
| | monomer (parts) | BzMA | | 15 | | | 15 |
| | | CHMA | | | | 40 | |
| | Carboxy | MAA | 10 | 34.4 | | | |
| | group-containing | HOMS | | | 23 | | |
| | Vinyl-based | PAMA | | | | 50 | |
| | monomer (parts) | TMA | | | | | 15 |
| | composition | | MMA/MAA | BzMA/MAA | MMA/HOMS | CHMA/PAMA | MMA/BzMA/TMA |
| | Compositional ratio (mass ratio) | | 66.7/33.3 | 30.3/69.7 | 46.5/53.6 | 41.8/58.2 | 25.0/37.5/37.5 |
| | TGL (parts) | | 1.5 | 1.5 | 1.5 | 3 | 1.5 |
| | V-601 (parts) | | 0.3 | 0.3 | 0.3 | 0.3 | 0.3 |
| Whole | Composition | | M2005/MOI/MMA/MAA | M2005/MOI/BzMA/MAA | M41/MOI/MMA/HOMS | M41/MOI/CHMA/PAMA | M3085/MOI/MMA/BzMA/TMA |
| | Compositional ratio (mass ratio) | | 72.6/5.6/14.5/7.3 | 63.6/5.0/9.5/21.9 | 66.3/5.2/13.3/15.2 | 50.6/3.9/20.2/25.3 | 68.9/3.6/6.9/10.3/10.3 |
| | Main chain/macromonomer (mass ratio) | | 21.8/78.2 | 31.4/68.6 | 33.7/66.3 | 45.5/54.5 | 27.5/72.5 |
| | Mn | | 13,500 | 12,900 | 14,600 | 17,500 | 15,800 |
| | PDI | | 2.10 | 2.08 | 1.93 | 1.98 | 2.13 |
| | Acid value (mgKOH/g) | | 46.5 | 142.7 | 37 | 51 | 17.9 |
| Content (%) of pigment dispersant | | | 50 | 50 | 50 | 50 | 50 |

Comparative Examples 1 and 2

Pigment dispersant compositions H-1 and H-2 were obtained in the same manner as in Example 1 described above except that the combinations shown in Table 2 were adopted. It was ascertained that the content of organic compounds having a boiling point of 250° C. or lower was 1% or less also for both of the pigment dispersant compositions. The meaning of the abbreviation in Table 2 is as described below.

DMFDG: dipropylene glycol ether dimethyl ether, manufactured by NIPPON NYUKAZAI CO., LTD.

TABLE 2

| | | | Comparative Example 1 | Comparative Example 2 |
|---|---|---|---|---|
| Pigment dispersant composition | | | H-1 | H-2 |
| Solvent | Name | | DMFDG | 50MB-11 |
| | Composition | | Dipropylene glycol dimethyl ether | PPG/PEG monobutyl ether |
| | Molecular weight | | 162.2 | 1,000 |
| | Amount (parts) | | 139.6 | 256.1 |
| Macromonomer | Name | | MA-1 | MA-1 |
| | One-end- | Name | M2005 | M2005 |
| | aminated | amount (parts) | 100 | 100 |
| | PPG/PEG | Composition | PPG/PEG | PPG/PEG |
| | copolymer | Compositional ratio (molar ratio) | 29/6 | 29/6 |
| | MOI (parts) | | 7.76 | 7.76 |
| | Mn | | 3,500 | 3,500 |
| | PDI | | 1.19 | 1.2 |
| Main chain | Additional monomer (parts) | MMA | 20 | 100 |
| | Carboxy group-containing vinyl-based monomer (parts) | MAA | 10 | 45 |

TABLE 2-continued

| | | Comparative Example 1 | Comparative Example 2 |
|---|---|---|---|
| | Composition | MMA/MAA | MMA/MAA |
| | Compositional ratio (mass ratio) | 66.7/33.3 | 69.0/31.0 |
| | TGL (parts) | 1.5 | 3 |
| | V-601 (parts) | 0.3 | 0.3 |
| Whole | Composition | M2005/MOI/MMA/MAA | M2005/MOI/MMA/MAA |
| | Compositional ratio (mass ratio) | 72.6/5.6/14.5/7.3 | 39.5/3.1/39.6/17.8 |
| | Main chain/macromonomer (mass ratio) | 21.8/78.2 | 57.4/42.6 |
| | Mn | 13,100 | 14,900 |
| | PDI | 1.95 | 1.97 |
| | Acid value (mgKOH/g) | 46.3 | 115.8 |
| Content (%) of pigment dispersant | | 50 | 50 |

Example 6

Macromonomer MA-1 was synthesized in the same manner as in Example 1 described above. Subsequently, into a reaction container, 159.6 parts of 50 MB-11, 15.0 parts of MMA, 35.0 parts of 2-(dimethylamino)ethyl methacrylate (DMAEMA), and 1.5 parts of α-methylstyrene (αMS) were added. The resultant mixture was heated to 70° C. under nitrogen bubbling, and then 0.2 parts of V-601 was added to perform polymerization for 4 hours. Further, 0.1 parts of V-601 was added to perform polymerization at 70° C. for 4 hours, and thus the polymer (2), which is a pigment dispersant, was formed to obtain pigment dispersant composition COV-6 in which the content of the pigment dispersant (polymer (2)) was 50%. Mn, PDI, and the amine value of the formed polymer (2) were 9,500, 1.91, and 78.4 mgKOH/g, respectively. In addition, it was ascertained that the content of organic compounds having a boiling point of 250° C. or lower was 1% or less.

Example 7

(a) Synthesis of Macromonomer

In a reaction container, 100 parts (0.05 mol) of M2005 was placed. Polyethylene glycol monolauryl ether (trade name "BLAUNON EL-1530," manufactured by AOKI OIL INDUSTRIAL Co., Ltd., Molecular weight about 1,500) (EL1530) in an amount of 148.3 parts was added thereto, and the resultant mixture was stirred and made uniform, and then cooled to room temperature. Into the reaction container, 7.76 parts (0.05 mol) of MOI was dropped over 30 minutes while the reaction container was cooled with water. After the dropping, part of the reaction solution was sampled to ascertain that isocyanate groups derived from MOI had disappeared almost completely and urea bonds had been produced by IR. Thereby, it was confirmed that macromonomer MA-4 represented by formula (1) had been produced. Mn and PDI of macromonomer MA-4 were 3,300 and 1.15, respectively, and the amine value was not able to be measured.

(b) Synthesis of Pigment Dispersant (Polymer (2))

In the above-described reaction container, 15.0 parts of MMA, 35.0 parts of DEAEMA, and 1.5 parts of αMS were added. The resultant mixture was heated to 70° C. under nitrogen bubbling, and then 0.2 parts of V-601 was added to perform polymerization for 4 hours. Further, 0.1 parts of V-601 was added to perform polymerization at 70° C. for 4 hours, and thus the polymer (2), which is a pigment dispersant, was formed to obtain pigment dispersant composition COV-7 in which the content of the pigment dispersant (polymer (2)) was 50%. Mn, PDI, and the amine value of the formed polymer (2) were 8,700, 1.88, and 49.0 mgKOH/g, respectively. In addition, it was ascertained that the content of organic compounds having a boiling point of 250° C. or lower was 1% or less.

Examples 8 to 10

Pigment dispersant compositions COV-8 to 10 were obtained in the same manner as in Example 6 described above except that the combinations shown in Table 3 were adopted. It was ascertained that the content of organic compounds having a boiling point of 250° C. or lower was 1% or less for any of the pigment dispersant compositions. The meanings of abbreviations in Table 3 are as described below.

MB-370: polypropylene glycol monobutyl ether, trade name "UNILUB MB-370," manufactured by NOF Corporation D-1200: polypropylene glycol, trade name "UNIOL D-1200," manufactured by NOF Corporation 50 MB-26: polypropylene glycol polyethylene glycol monobutyl ether, trade name "UNILUB 50 MB-26," manufactured by NOF Corporation EHMA: 2-ethylhexyl methacrylate 2-VP: 2-vinylpyridine 4-VP: 4-vinylpyridien 1-VI: 1-vinylimidazole

TABLE 3

| | | Example 6 | Example 7 | Example 8 | Example 9 | Example 10 |
|---|---|---|---|---|---|---|
| Pigment dispersant composition | | COV-6 | COV-7 | COV-8 | COV-9 | COV-10 |
| Solvent | Name | 50MB-11 | EL1530 | MB-370 | D-1200 | 50MB-26 |
| | Composition | PPG/PEG monobutyl ether | PEG monolauryl ether | PPG monobutyl ether | PPG | PPG/PEG monobutyl ether |
| | Molecular weight | 1,000 | 1,500 | 2,300 | 1,200 | 2,000 |
| | Amount (parts) | 159.6 | 148.3 | 145.1 | 137.6 | 196 |

TABLE 3-continued

| | | | Example 6 | Example 7 | Example 8 | Example 9 | Example 10 |
|---|---|---|---|---|---|---|---|
| Macro-monomer | Name | | MA-1 | MA-4 | MA-2 | MA-2 | MA-3 |
| | One-end-aminated PPG/PEG copolymer | Name | M2005 | M2005 | M41 | M41 | M3085 |
| | | Amount (parts) | 100 | 100 | 100 | 100 | 100 |
| | | Composition | PPG/PEG | PPG/ PEG | PPG/PEG | PPG/PEG | PPG/PEG |
| | | Compositional ratio (molar ratio) | 29/6 | 29/6 | 1/4 | 1/4 | 8/58 |
| | MOI (parts) | | 7.76 | 7.76 | 7.82 | 7.82 | 5.17 |
| | Mn | | 3,500 | 3,300 | 3,300 | 3,300 | 3,900 |
| | PDI | | 1.19 | 1.15 | 1.16 | 1.16 | 1.17 |
| Main chain | Additional monomer (parts) | MMA | 15 | 15 | | | 30 |
| | | BzMA | | | 20 | | |
| | | EHMA | | | | 16 | 34 |
| | | OMS | 1.5 | 1.5 | 2 | 1.5 | 2.5 |
| | Amino group-containing vinyl-based monomer (parts) | DMAEMA | 35 | | | | |
| | | DEAEMA | | 24 | | | |
| | | 2-VP | | | 15 | | |
| | | 4-VP | | | | 12 | |
| | | 1-VI | | | | | 24 |
| | Composition | | MMA/DMAEMA/αMS | MMA/DEAEMA/αMS | BzMA/2-VP/αMS | EHMA/4-VP/αMS | MMA/BHMA/1-VP/αMS |
| | Compositional ratio (mass ratio) | | 29.1/68.0/2.9 | 37.0/59.3/3.7 | 74.6/22.4/3.0 | 54.2/40.7/5.1 | 33.1/37.6/26.5/2.8 |
| | V-601 (parts) | | 0.3 | 0.3 | 0.3 | 0.3 | 0.3 |
| Whole | Composition | | M2005/MOI/MMA/DMAEA/αMS | M2005/MOI/MMA/DEAEMA/αMS | M41/MOI/BzMA/2-VP/αMS | M41/MOI/EHMA/4-VP/αMS | M3085/MOI/MMA/EHMA/1-VI/αMS |
| | Compositional ratio (mass ratio) | | 62.8/4.9/9.4/22.0/0.9 | 67.5/5.2/10.1/16.2/1.0 | 57.2/4.5/28.6/8.6/1.1 | 72.8/5.7/11.7/8.7/1.1 | 51.1/2.6/15.3/17.4/12.2/1.3 |
| | Main chain/macromonomer | | 32.3/67.7 | 27.3/72.7 | 38.3/61.7 | 21.5/78.5 | 46.3/53.7 |
| | Mn | | 9,500 | 8,700 | 15,500 | 11,500 | 18,200 |
| | PDI | | 1.91 | 1.88 | 1.95 | 1.76 | 2.01 |
| | Amine value (mgKOH/g) | | 78.4 | 49 | 45.8 | 57.6 | 72.6 |
| Content (%) of pigment dispersant | | | 50 | 50 | 50 | 50 | 50 |

Comparative Examples 3 and 4

Pigment dispersant compositions H-3 and H-4 were obtained in the same manner as in Example 6 described above except that the combinations shown in Table 4 were adopted. It was ascertained that the content of organic compounds having a boiling point of 250° C. or lower was 1% or less also for both of the pigment dispersant compositions. The meaning of the abbreviation in Table 4 is as described below.

M600: one-end-aminated polypropylene glycol polyethylene glycol monomethyl ether copolymer, trade name "JEFFAMINE M600," manufactured by Huntsman Corporation

TABLE 4

| | | | Comparative Example 3 | Comparative Example 4 |
|---|---|---|---|---|
| Pigment dispersant composition | | | H-3 | H-4 |
| Solvent | Name | | 50MB-11 | 50MB-26 |
| | Composition | | PPG/PEG monobutyl ether | PPG/PEG monobutyl ether |
| | Molecular weight | | 1,000 | 2,000 |
| | Amount (parts) | | 194.6 | 172.7 |
| Macromonomer | Name | | MA-1 | MA-5 |
| | One-end-aminated PPG/ PEG copolymer | Name | M2005 | M600 |
| | | Amount (parts) | 100 | 100 |
| | | Composition | PPG/PEG | PPG/PEG |
| | | Compositional ratio (molar ratio) | 29/6 | 9/1 |
| | MOI (parts) | | 7.76 | 25.86 |
| | Mn | | 3,500 | 700 |
| | PDI | | 1.19 | 1.04 |
| Main chain | Additional monomer (parts) | BzMA | 80 | 20 |
| | | αMS | 1.5 | 1.5 |
| | Amino group-containing vinyl-based monomer (parts) | DMAEMA | 5 | — |
| | | 4-VP | — | 25 |
| | Composition | | BzMA/DMAEMA | BzMA/4-VP |
| | Compositional ratio (mass ratio) | | 94.1/5.9 | 44.4/55.6 |
| | V-601 (parts) | | 0.3 | 3 |

TABLE 4-continued

| | | Comparative Example 3 | Comparative Example 4 |
|---|---|---|---|
| Whole | Composition | M2005/MOI/BzMA/ DMAEMA/αMS | M600/MOI/BzMA/ 4-VP/αMS |
| | Compositional ratio (mass ratio) | 51.5/4.0/ 41.2/2.6/0.8 | 58.0/15.0/ 11.6/14.5/0.9 |
| | Main chain/macromonomer | 44.5/55.5 | 27.0/73.0 |
| | Mn | 24,100 | 8,200 |
| | PDI | 2.23 | 1.79 |
| | Amine value (mgKOH/g) | 9.2 | 77.2 |
| Content (%) of pigment dispersant | | 50 | 50 |

<Pigment Dispersion for Ultraviolet-Curable Inkjet Ink>

Examples 11 to 15 and Comparative Examples 5 and 6

(a) Production of Pigment Dispersions

Components of the types and in the amounts (parts), shown in Table 5, were blended, and the resultant mixture was stirred for 2 hours using a dissolver. After it was ascertained that lumps of the pigment disappeared, a dispersion treatment was performed using a horizontal media disperser to prepare a pigment dispersion of each color (yellow (Y) color, magenta (M) color, cyan (C) color, black (Bk), and white (W) color). In Table 5, "Synergist 1," "Synergist 2," and "Synergist 3" are pigment derivatives which have a basic group and which are represented by the following formulas (I) to (III), respectively. In addition, the meanings of abbreviations in Table 5 are as described below.

PY-150: trade name "LEVASCREEN YELLOW," manufactured by LANXESS AG

PR-122: manufactured by Dainichiseika Color & Mfg. Co., Ltd.

PB-15:4: manufactured by Dainichiseika Color & Mfg. Co., Ltd.

Carbon black: MB-1000, manufactured by Mitsubishi Chemical Corporation

Titanium oxide: trade name "JR-405," manufactured by TAYCA CORPORATION

BzA: benzyl acrylate

IBXA: isobornyl acrylate

PEA: 2-phenylethyl acrylate

TBCHA: 4-tert-butylcyclohexyl acrylate (I)

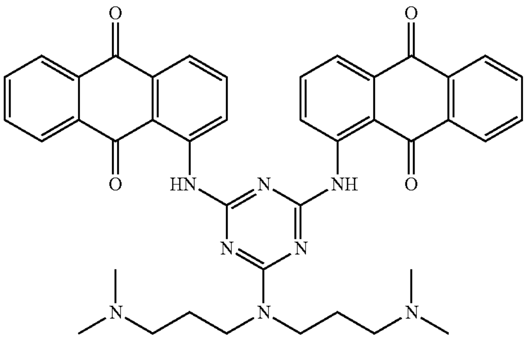

-continued (II)

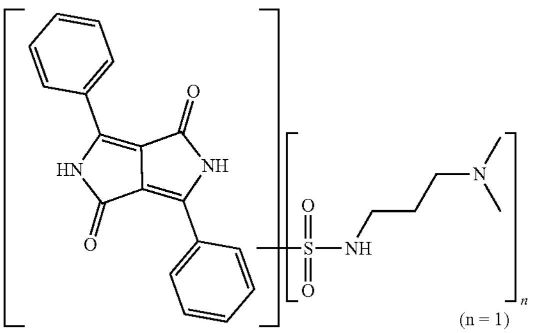

(n = 1)

(III)

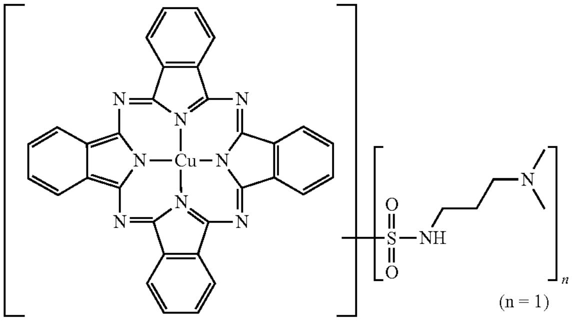

(n = 1)

TABLE 5

(unit: part)

| | Example 11 Y color pigment dispersion-1 | Example 12 M color pigment dispersion-1 | Example 13 C color pigment dispersion-1 | Example 14 Bk color pigment dispersion-1 | Example 15 W color pigment dispersion-1 | Comparative Example 5 M color pigment dispersion-2 | Comparative Example 6 C color pigment dispersion-2 |
|---|---|---|---|---|---|---|---|
| PY-150 | 18 | | | | | | |
| PR-122 | | 18 | | | | 18 | |
| PB-15:4 | | | 18 | | | | 18 |
| Carbon black | | | | 19 | | | |
| Titanium oxide | | | | | 50 | | |
| COV-1 | 12 | | | | | | |
| COV-2 | | 12 | | | | | |
| COV-3 | | | 12 | | | | |
| COV-4 | | | | 12 | | | |
| COV-5 | | | | | 5 | | |
| H-1 | | | | | | 12 | |
| H-2 | | | | | | | 12 |
| Synergist 1 | 2 | | | | | | |
| Synergist 2 | | 2 | | | | 2 | |
| Synergist 3 | | | 2 | 1 | | | 2 |
| BzA | 68 | | | | | 68 | |
| IBXA | | 68 | | | | | 68 |
| PEA | | | 68 | | 45 | | |
| TBCHA | | | | 68 | | | |
| Total | 100 | 100 | 100 | 100 | 100 | 100 | 100 |

(b) Evaluation of Pigment Dispersions

The initial particle sizes of the pigments in the pigment dispersions and the initial viscosities of the pigment dispersions were measured. Further, the pigment dispersions were stored at 70° C. for 1 week, and the particle sizes of the pigments and the viscosities of the pigment dispersions were measured after the storage. Results are shown in Table 6. The particle sizes of the pigments are median sizes ($D_{50}$) measured using a dynamic light scattering particle size distribution analyzer (trade name "SZ-100," manufactured by HORIBA, Ltd.).

TABLE 6

| | Example 11 Y color pigment dispersion-1 | Example 12 M color pigment dispersion-1 | Example 13 C color pigment dispersion-1 | Example 14 Bk color pigment dispersion-1 | Example 15 W color pigment dispersion-1 | Comparative Example 5 M color pigment dispersion-2 | Comparative Example 6 C color pigment dispersion-2 |
|---|---|---|---|---|---|---|---|
| Initial particle size (nm) | 102 | 105 | 101 | 105 | 234 | 106 | 104 |
| Particle size after storage (nm) | 103 | 104 | 102 | 103 | 231 | 106 | 235 |
| Initial viscosity (mPa · s) | 43.6 | 45.5 | 44.1 | 47.6 | 41.9 | 25.8 | 44.8 |
| Viscosity after storage (mPa · s) | 43.4 | 44.9 | 43.7 | 47.5 | 41.8 | 25.7 | 78.4 |

W color pigment dispersion-1 prepared in Example 15 was placed in a light-shielding glass bottle and stored in a thermostatic chamber set at 60° C. for 1 month. The particle size of the pigment in the pigment dispersion after the storage was 237 nm, and the viscosity of the pigment dispersion after the storage was 42.1 mPa·s. From these, it was found that the physical properties were almost unchanged by the storage and a high level of dispersion stability was maintained. In addition, a supernatant was hardly recognized in the pigment dispersion after the storage. Note that somewhat viscous sediment was slightly recognized but, when shaken, returned to the original state of the pigment dispersion. The particle size of the pigment in the pigment dispersion after being shaken was 240 nm. From the above results, it was found that the particle size of the pigment became slightly larger due to sedimentation but the sediment was easily dispersed again and returned to a favorable dispersion state.

Examples 16 to 20 and Comparative Examples 7 and 8

(a) Preparation of Pigment Dispersions

Color pigment dispersions were prepared in the same manner as in Examples 11 to 15 and Comparative Examples 5 and 6, described above, except that components of the types and in the amounts (parts), shown in Table 7, were used. In Table 7, "Synergist 4," "Synergist 5," and "Synergist 6" are pigment derivatives which have an acidic group and which are represented by the following formulas (IV) to (VI), respectively.

-continued (IV)

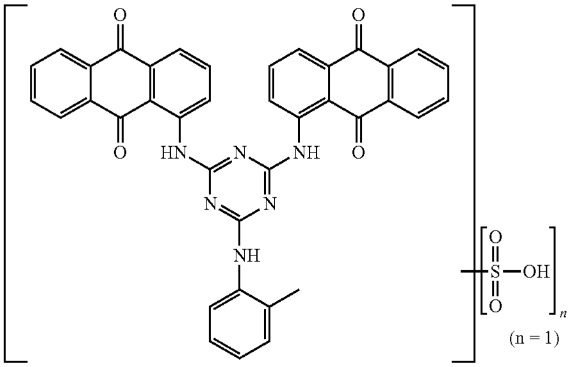

(n = 1)

(V)

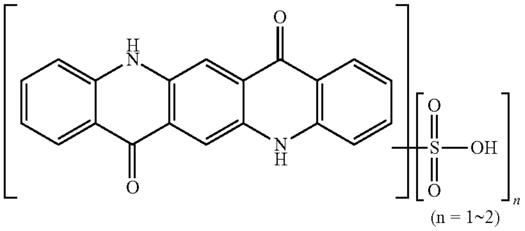

(n = 1~2)

(VI)

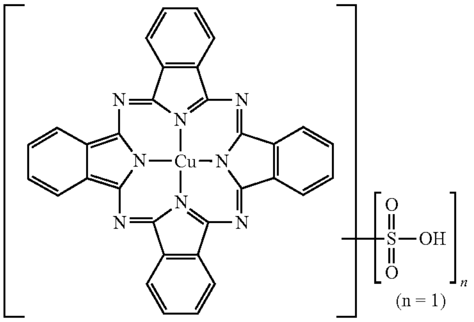

(n = 1)

TABLE 7

| (unit: part) | Example 16 Y color pigment dispersion-2 | Example 17 M color pigment dispersion-3 | Example 18 C color pigment dispersion-3 | Example 19 Bk color pigment dispersion-2 | Example 20 W color pigment dispersion-2 | Comparative Example 7 Y color pigment dispersion-3 | Comparative Example 8 W color pigment dispersion-3 |
|---|---|---|---|---|---|---|---|
| PY-150 | 18 | | | | | | |
| PR-122 | | 18 | | | | 18 | |
| PB-15:4 | | | 18 | | | | |
| Carbon black | | | | 19 | | | |
| Titanium oxide | | | | | 50 | | 50 |
| COV-6 | 12 | | | | | | |
| COV-7 | | 12 | | | | | |
| COV-8 | | | 12 | | | | |
| COV-9 | | | | 12 | | | |
| COV-10 | | | | | 5 | | |
| H-3 | | | | | | 12 | |
| H-4 | | | | | | | 5 |
| Synergist 4 | 2 | | | | | | |
| Synergist 5 | | 2 | | | | 2 | |
| Synergist 6 | | | 2 | 1 | | | 2 |
| BzA | 68 | | | | | 68 | |
| IBXA | | 68 | | | | | |
| PEA | | | 68 | | 45 | | 45 |
| TBCHA | | | | 68 | | | |
| Total | 100 | 100 | 100 | 100 | 100 | 100 | 100 |

(b) Evaluation of Pigment Dispersions

The initial particle sizes of the pigments in the pigment dispersions and the initial viscosities of the pigment dispersions were measured. Further, the pigment dispersions were stored at 70° C. for 1 week, and the particle sizes of the pigments and the viscosities of the pigment dispersions were measured after the storage. Results are shown in Table 8.

TABLE 8

| | Example 16 Y color pigment dispersion-2 | Example 17 M color pigment dispersion-3 | Example 18 C color pigment dispersion-3 | Example 19 Bk color pigment dispersion-2 | Example 20 W color pigment dispersion-2 | Comparative Example 7 Y color pigment dispersion-3 | Comparative Example 8 W color pigment dispersion-3 |
|---|---|---|---|---|---|---|---|
| Initial particle size (nm) | 100 | 104 | 103 | 108 | 237 | 102 | 250 |
| Particle size after storage (nm) | 100 | 105 | 104 | 104 | 238 | 250 | 303 |
| Initial viscosity (mPa · s) | 42.1 | 44.2 | 45.6 | 46.4 | 46.8 | 42.8 | 56.7 |
| Viscosity after storage (mPa · s) | 41.8 | 44.3 | 45.4 | 46.5 | 47.0 | 86.3 | 96.4 |

<Ultraviolet-Curable Inkjet Ink>

Examples 21 to 25 and Comparative Example 9

Components of the types and in the amounts (parts), shown in Table 9, were blended, and the resultant mixture was sufficiently stirred using a dissolver. The mixture was filtrated in sequence with a membrane filter having a pore size of 10 μm and with a membrane filter having a pore size of 5 μm to obtain each ultraviolet-curable inkjet ink. In Table 9, all of "Lucirin TPO," "Irgacure 819," and "Irgacure 127" are trade names of photopolymerization initiators manufactured by BASF SE. Any of the inks did not gel, and sediment was not produced in any of the inks.

TABLE 9

(unit: part)

| | Example 21 Y color pigment ink-1 | Example 22 M color pigment ink-1 | Example 23 C color pigment ink-1 | Example 24 Bk color pigment ink-1 | Example 25 W color pigment ink-1 | Comparative Example 9 M color pigment ink-2 |
|---|---|---|---|---|---|---|
| Y color pigment dispersion-1 | 25 | | | | | |
| M color pigment dispersion-1 | | 25 | | | | |
| C color pigment dispersion-1 | | | 25 | | | |
| Bk color pigment dispersion-1 | | | | 25 | | |
| W color pigment dispersion-1 | | | | | 30 | |
| M color pigment dispersion-2 | | | | | | 25 |
| BzA | 67 | | | | | |
| IBXA | | 67 | | | | 67 |
| PEA | | | 67 | | 62 | |
| TBCHA | | | | 67 | | |
| Lucirin TPO | 3 | 3 | 3 | 3 | 3 | 3 |
| Irgacure 819 | 2 | 2 | 2 | 2 | 2 | 2 |
| Irgacure 127 | 3 | 3 | 3 | 3 | 3 | 3 |
| Total | 100 | 100 | 100 | 100 | 100 | 100 |
| Content (%) of pigment | 5 | 5 | 5 | 5 | 15 | 5 |

Examples 26 to 30

Ultraviolet-curable inkjet inks were obtained in the same manner as in Examples 21 to 25 and Comparative Example 9, described above, except that components of the types and in the amounts (parts), shown in Table 10, were used. Any of the inks did not gel, and sediment was not produced in any of the inks.

TABLE 10

| | Example 26 Y color pigment ink-2 | Example 27 M color pigment ink-3 | Example 28 C color pigment ink-2 | Example 29 Bk color pigment ink-2 | Example 30 W color pigment ink-2 |
|---|---|---|---|---|---|
| Y color pigment dispersion-2 | 25 | | | | |
| M color pigment dispersion-3 | | 25 | | | |
| C color pigment dipersion-3 | | | 25 | | |
| Bk color pigment dispersion-2 | | | | 25 | |
| W color pigment dispersion-2 | | | | | 30 |
| BzA | 67 | | | | |
| IBXA | | 67 | | | |
| PEA | | | 67 | | 62 |
| TBCHA | | | | 67 | |
| Lucirin TPO | 3 | 3 | 3 | 3 | 3 |
| Irgacure 819 | 2 | 2 | 2 | 2 | 2 |
| Irgacure 127 | 3 | 3 | 3 | 3 | 3 |
| Total | 100 | 100 | 100 | 100 | 100 |
| Content (%) of pigment | 5 | 5 | 5 | 5 | 15 |

(unit: part)

<Evaluation of Ultraviolet-Curable Inkjet Inks>

Each prepared ink was filled in an ink cartridge and installed in an inkjet printer (trade name "EB100," manufactured by KONICA MINOLTA, INC.). A solid image was continuously printed using this inkjet printer for 1 hour on a polyethylene terephthalate (PET) film. As a result, for any of the inks, clogging did not occur in nozzles of the print head and printing was able to be performed smoothly. In addition, neither a streak nor dot misdirection were not recognized at all and ejection stability was favorable.

Further, a solid image was printed also on a surface-treated polypropylene (OPP) using the above-described inkjet printer. Then, the images printed on the PET film and the OPP film were irradiated with ultraviolet rays using a UV lamp to cure the coating films, and thus a cured image was obtained for each color. A cellophane tape (trade name "Cellotape®," manufactured by Nichiban Co., Ltd.) was pressed sufficiently against the cured image of each color, and then the cellophane tape was peeled. The extent of the image peeled was visually observed to evaluate the adhesiveness of the image according to the evaluation criteria described below. Results are shown in Table 11.

Excellent: the image is not peeled at all.

Good: the image is slightly peeled.

Fair: the area of the image peeled is smaller than the area of the image left unpeeled.

Poor: the area of the image peeled is larger than the area of the image left unpeeled.

| | Pigment ink | Adhesiveness PET film | Adhesiveness OPP film |
|---|---|---|---|
| Example 21 | Y color pigment ink-1 | Excellent | Excellent |
| Example 22 | M color pigment ink-1 | Excellent | Excellent |
| Example 23 | C color pigment ink-1 | Excellent | Excellent |

-continued

| | Pigment ink | Adhesiveness PET film | Adhesiveness OPP film |
|---|---|---|---|
| Example 24 | Bk color pigment ink-1 | Excellent | Excellent |
| Example 25 | W color pigment ink-1 | Excellent | Excellent |
| Example 26 | Y color pigment ink-2 | Excellent | Excellent |
| Example 27 | M color pigment ink-3 | Excellent | Excellent |
| Example 28 | C color pigment ink-2 | Excellent | Excellent |
| Example 29 | Bk color pigment ink-2 | Excellent | Excellent |
| Example 30 | W color pigment ink-2 | Excellent | Excellent |
| Comparative Example 9 | M color pigment ink-2 | Poor | Fair |

INDUSTRIAL APPLICABILITY

The pigment dispersant composition and pigment dispersion of the present invention are useful as a material for preparing a pigment dispersion for an environmentally friendly active energy ray-curable inkjet ink. Further, the active energy ray-curable inkjet ink of the present invention is suitable as an ink for printing on a food package, an electronic parts package, a label, or the like.

The invention claimed is:

1. A pigment dispersant composition comprising:

a polyglycol component that has at least one alkylene chain selected from the group consisting of $CH_2CH_2$, $CH_2CH(CH_3)$, and $CH_2CH_2CH_2CH_2$, and has a number average molecular weight in a range from 1,000 to 4,000; and a polymer component that has a number average molecular weight in a range from 5,000 to 20,000 and that has:

from 50 to 80% by mass of a constituent unit (1) derived from a macromonomer represented by the following formula (1) and having a number average molecular weight in a range from 1,000 to 4,000, from 5 to 25% by mass of a constituent unit (2) derived from at least one functional group-containing vinyl-based monomer selected from the group consisting of a carboxy group-containing vinyl-based monomer and an amino group-containing vinyl-based monomer, and from 0 to 45% by mass of a constituent unit (3) derived from an additional monomer, wherein the polyglycol component is at least one material selected from the group consisting of a polyalkylene glycol, a polyalkylene glycol monoalkyl (C1 to C18) ether, and a polyalkylene glycol dialkyl (C1 to C4) ether, and a content of an organic compound having a boiling point of 250° C. or lower is 1% by mass or less:

(1)

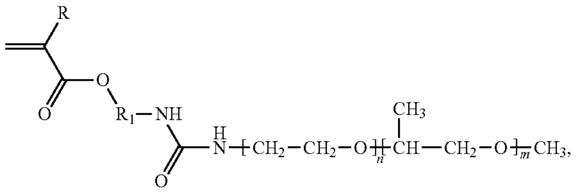

wherein R represents a hydrogen atom or a methyl group, $R_1$ represents $CH_2CH_2$ or $CH_2CH_2OCH_2CH_2$, and m+n=20 to 100.

2. The pigment dispersant composition according to claim 1, wherein the polymer component further has 5% by mass or less of a constituent unit (4) derived from a chain transfer agent based on a total amount of the constituent unit (1), the constituent unit (2), and the constituent unit (3).

3. The pigment dispersant composition according to claim 2, wherein the chain transfer agent is at least one material selected from the group consisting of iodine, dodecanethiol, and thioglycerol, and a content of the constituent unit (4) in the polymer component is in a range from 0.5 to 3% by mass based on the total amount of the constituent unit (1), the constituent unit (2), and the constituent unit (3).

4. The pigment dispersant composition according to claim 1, wherein the carboxy group-containing vinyl-based monomer is at least one material selected from the group consisting of (meth)acrylic acid, 2-(meth)acryloyloxyethyl succinate, 1-(meth)acryloyloxy phthalate, and 1-(meth)acryloyloxy-1,2,4-benzenetricarboxylic acid ester, the amino group-containing vinyl-based monomer is at least one material selected from the group consisting of dimethylaminoethyl (meth)acrylate, diethylaminoethyl (meth)acrylate, 2-vinylpyridine, 4-vinylpyridine, and vinylimidazole, and the additional monomer is α-methylstyrene.

5. The pigment dispersant composition according to claim 1, wherein the polyglycol component is a liquid containing 30% by mass or more of a propylene oxide unit and having a viscosity at 25° C. of 2 Pa·s or lower.

6. A method for producing a pigment dispersant composition, the method being a method for producing the pigment dispersant composition according to claim 1 and comprising:

polymerizing a monomer component comprising the macromonomer and the functional group-containing vinyl-based monomer using the polyglycol component as a polymerization solvent at a temperature of 50° C. or higher in the presence of a radical generator.

7. A pigment dispersion to be used for producing an active energy ray-curable inkjet ink, wherein the pigment dispersion comprises:

the pigment dispersant composition according to claim 1;

a pigment; and a photopolymerizable monomer.

8. An active energy ray-curable inkjet ink comprising:

the pigment dispersion according to claim 7; and a photopolymerization initiator.

* * * * *